United States Patent [19]

Roszhart

[11] Patent Number: 4,945,765
[45] Date of Patent: Aug. 7, 1990

[54] SILICON MICROMACHINED ACCELEROMETER

[75] Inventor: Terry V. Roszhart, North Caldwell, N.J.

[73] Assignee: Kearfott Guidance & Navigation Corp., Wayne, N.J.

[21] Appl. No.: 238,662

[22] Filed: Aug. 31, 1988

[51] Int. Cl.$^5$ ............................................. G01P 15/10
[52] U.S. Cl. ............................ 73/517 AV; 73/DIG. 1
[58] Field of Search .......... 73/517 R, 517 B, 517 AV, 73/651, 862.59, DIG. 1, DIG. 4; 310/329

[56] References Cited

U.S. PATENT DOCUMENTS

| | | | |
|---|---|---|---|
| 4,517,841 | 5/1985 | Peters et al. | 73/517 AV |
| 4,553,436 | 11/1985 | Hansson | 73/517 |
| 4,653,326 | 3/1987 | Danel et al. | 73/517 R |
| 4,658,174 | 4/1987 | Albert | 73/517 AVX |
| 4,670,092 | 6/1987 | Montamedi | 73/517 RX |
| 4,679,434 | 7/1987 | Stewart | 73/517 RX |
| 4,699,006 | 10/1987 | Boxenhorn | 73/517 AV |
| 4,718,275 | 1/1988 | Norling | 73/517 AVX |
| 4,736,629 | 4/1988 | Cole | 73/517 R |
| 4,766,768 | 8/1988 | Norling et al. | 73/517 AV |
| 4,805,456 | 2/1989 | Howe et al. | 73/517 AV |

FOREIGN PATENT DOCUMENTS

| | | | |
|---|---|---|---|
| 794546 | 3/1978 | U.S.S.R. | 73/517 AV |
| 2121953 | 1/1984 | United Kingdom . | |
| 2162314 | 1/1986 | United Kingdom . | |

OTHER PUBLICATIONS

Design News Feb. 1, 1988, Pgs, 68/69, "Tiny Accelerometer Weights Just One Gram".

Primary Examiner—John Chapman
Attorney, Agent, or Firm—Lowe, Price Leblanc, Becker & Shur

[57] ABSTRACT

An inertial guidance accelerometer is formed as an integrated, monolithic, structure. Silicon micro-machining techniques are used to combine mechanical and electrical components of the device in a single crystal silicon wafer. The proof mass, flexible hinge, and resonator are formed by etching portions of a substrate, while the electrical circuits are monolithically integrated into the substrate using standard circuit integration techniques. The accelerometer includes a feedback control circuit for the resonator, as well as a digital-to-analog converter, for providing digital output signals indicative of the acceleration force applied to the device.

19 Claims, 6 Drawing Sheets

SILICON MICROMACHINED ACCELEROMETER

TECHNICAL BACKGROUND

This invention relates to accelerometers, and more particularly to compact, monolithically integrated, accelerometers structured to permit manufacture by solid state fabrication techniques.

BACKGROUND ART

Various types of accelerometers are known in the prior art. High performance accelerometers, of the inertial grade type, however, are typically large, with many individual parts, and are expensive to produce.

Accelerometers of the prior art typically include a proof mass, a flexure hinge, and a force sensitive transducer. One type of accelerometer, known as a vibrating beam accelerometer, typically uses a proof mass and flexure hinge made of metal, and an acoustic resonator made of quartz or other piezoelectric material.

For such accelerometer structures, utilizing the above-identified materials, high performance accelerometers may be fabricated with accuracies to within one part in $10^7$. Such accelerometers are typically several cubic inches in size and weigh approximately one pound. A somewhat larger package is required to house additional power supplies and the data handling electronics required therefor.

Conventional manufacturing techniques for metal and quartz are limited in their ability to produce mechanical assemblies that are smaller, or lower in cost, than the devices currently available. Thus, the prior art accelerometers are constrained by the materials utilized therein and the methods of fabrication thereof rather than by problems of mechanical or electrical design. It is thus desirable to provide a new technology for fabrication of accelerometers in order to reduce the size and cost thereof.

More particularly, it is desired to reduce the size of accelerometer devices in order to reduce the length of thermal and electrical conduction paths used therein. It is known that long paths of conduction may result in large thermal gradients. These effects reduce the accuracy, stability and performance of the accelerometer. Further, the large size of currently available accelerometers results in increased sensitivity to stray capacitance and electromagnetic radiation. Accordingly, the presently available accelerometers suffer from disadvantages caused by the large size thereof, including particularly limitations on stability and accuracy. Yet another disadvantage resulting from the large size of presently available accelerometers is a low resonant frequency of the proof mass caused by the increased size, which increases the response time of the accelerometer.

Accordingly, while prior art inertial accelerometers may have dynamic ranges and sensitivities which are in the neighborhood of one part in $10^7$, the performance of the accelerometer and its reliability may be improved by an order of magnitude upon a reduction in the size thereof. However, the prior art has been unable to provide the significant size reductions necessary to attain the desired increase in performance.

DISCLOSURE OF INVENTION

It is accordingly an object of the present invention to overcome the difficulties of the prior art and to provide an accelerometer structure having significantly reduced dimensions.

It is a more particular object of the invention to reduce the size and weight of an accelerometer by utilization of silicon micromachining techniques.

Still a more specific object of the invention is the utilization of integration techniques to provide a single crystal, monolithic, integrated accelerometer structure.

It is yet another object of the invention to provide an integrated accelerometer structure, including both mechanical and electronic components integrated in a single package.

Yet a further object of the invention is the provision of an integrated structure, wherein both a mechanical component and an electronic component are integrated in a single, monolithic, crystal.

Still another object of the invention is the provision of a method for making a single crystal, integrated, accelerometer.

It is another object of the invention to provide a method for making a monolithic accelerometer structure wherein mechanical and electronic components are integrated into a single crystal structure.

It is a further object of the invention to provide a method for making an integrated accelerometer by etching a substrate to form a proof mass and flexure hinge therefor, as well as a resonant stress/strain sensor, and further to provide an electronic component integrated in the single crystal structure.

In accordance with these and other objects of the invention, there is provided an integrated accelerometer including a substrate having a monolithic single crystal structure. The monolithic structure includes therein both a mechanical portion and an electrical portion of the accelerometer. The mechanical portion is provided for oscillating at a predetermined frequency in response to application thereto of a predetermined acceleration, and the electrical portion is operable for converting oscillation of the mechanical portion to an electrical signal indicative of the magnitude of the applied acceleration.

Preferably, the mechanical portion of the integrated accelerometer includes a proof mass, a flexible hinge for hingedly separating the proof mass from a main body portion of the substrate, and a resonator. The resonator is operable for converting mechanical acceleration of the proof mass to an oscillating signal. The proof mass, flexible hinge and the resonator are all monolithically integrated in the substrate. Additionally, the electrical portion includes a closed loop feedback arrangement for controlling the oscillating signal. The electrical portion may further include an analog-to-digital converter responsive to the oscillating signal, for providing a digital electrical output signal representative of a frequency of oscillation of the oscillating signal.

The resonator is also arranged, separately from the flexible hinge, to connect the proof mass and the main body portion of the substrate. The flexible hinge may be formed in the vertical central portion of a horizontal separating region, separating the proof mass and the main body portion of the substrate. The resonator, on the other hand, may be formed at the surface of the substrate and may be separated from the flexible hinge by a cavity portion.

In accordance with a more detailed aspect of the invention, there is provided a silicon micromachined accelerometer, including a monolithic, single crystal, substrate. The structure includes a proof mass assembly monolithically integrated into the substrate. A main body portion and a flexible hinging arrangement are monolithically integrated in the substrate for hingedly connecting the proof mass assembly to the main body. A resonating device is also monolithically integrated in the substrate. The resonating device is responsive to the proof mass assembly for converting mechanical acceleration of the proof mass assembly to an oscillating signal. The accelerometer further includes an electrical circuit, responsive to the oscillating signal, for providing an electrical output signal representative thereof.

Portions of the electrical circuit may be monolithically integrated in the substrate. Preferably, the electrical circuit includes an analog-to-digital converter which is also monolithically integrated in the substrate. The converter is operable for converting the oscillating signal to digital data, having a value representative of a force applied to the proof mass assembly.

The accelerometer may be arranged as a push-pull structure, wherein the proof mass assembly includes first and second proof masses. In this embodiment, the flexible hinging arrangement includes first and second flexible hinges for flexibly connecting the first and second proof masses, respectively, to the main body portion. Additionally, the resonating device includes first and second resonators connected between the proof masses and the main body portion. In accordance with the opposite, parallel, orientation, the first proof mass and first resonator are preferably aligned in an orientation having a first input axis, and the second mass and second resonator are aligned in an orientation having a second input axis. With such an orientation, the first and second axes are parallel and opposite in direction to one another. One of the resonators is arranged so that acceleration of the proof mass connected thereto results in a force which, in turn, results in a tensile stress therein. The other of the resonators is arranged so that the same acceleration, applied to the respective proof mass connected thereto, results in a compressive stress therein. Thus, the frequency of oscillation of the first resonator is increased and the frequency of oscillation of the second resonator is decreased in response to application of an acceleration to the accelerometer. A frequency difference measurement circuit is included in the accelerometer for measuring a difference frequency between the frequencies of oscillation of the first and second resonators, thereby providing an output indication of the acceleration as a function of the difference frequency.

The resonating device may include an electrostatically responsive structure for oscillating at a frequency determined, in part, by acceleration of the proof mass assembly. The electrostatically responsive structure may include a resonator driven by electrostatic forces. An electrical feedback gain circuit may be provided for oscillating the resonator at a frequency responsive to stress or strain in the resonator caused by its mechanical response to acceleration of the proof mass assembly.

The electrical feedback gain circuit may be monolithically integrated in an electronic plate, bonded to the substrate.

Alternatively, the push-pull accelerometer may include first and second piezoelectric miniature resonators and first and second electrical feedback circuits for oscillating the first and second resonators in response to acceleration of the first and second proof masses.

In this embodiment, the piezoelectric resonators may include micromachined silicon resonators that have piezoelectric material deposited or coated on some of their surfaces.

In accordance with the invention, there is also provided a method for making an accelerometer, including the steps of outlining a surface of a resonator on a region of a first surface of a doubly polished wafer, which may be the top surface thereof. The method further includes doping the outlined region with an impurity to form the resonator, outlining top and bottom boundaries of a proof mass assembly on regions of the top and bottom surfaces of the wafer, and applying an etchant to the surfaces of the wafer to form both the proof mass assembly and a flexure hinge connecting the proof mass assembly to a main body portion of the accelerometer.

In accordance with the method of the invention, the first outlining step may include the step of depositing a pattern of a protective coating on a doubly polished wafer. When such a pattern is deposited, the doping step is followed by a step of removing the deposited pattern. The second recited outlining step may include the further step of depositing second and third patterns of a protective coating on the top and bottom surfaces of the wafer, thus defining the top and bottom boundaries of the proof mass assembly. In such a sequence of steps, there may also be provided the further step of aligning the first, second and third patterns for chemically defining the resonator and the proof mass assembly in a single etching process.

As hereinabove noted with respect to the accelerometer produced by the invention, the inventive method may include the step of integrating into the main body portion of the accelerometer an electronic feedback circuit for the resonator formed in the doping step. Such an integration step may be accompanied by a further step of integrating into the main body portion of the accelerometer a digital-to-analog converting circuit for converting an oscillating signal of the resonator to a digital data value representative of a force applied to the proof mass assembly.

The method of the invention may, alternatively, include the steps of integrating the electronic feedback circuit into an electronic plate. A feedback gain circuit may be incorporated in the electronic feedback arrangement. The feedback gain circuit is operable for oscillating the resonator at a frequency responsive to a capacitance determined by a position of the resonator caused by mechanical response thereof to acceleration of the proof mass assembly. The inventive method may thus further include the step of bonding the electronic plate to the main body portion of the accelerometer.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

PREFERRED EMBODIMENT FOR CARRYING OUT

Figure 1:
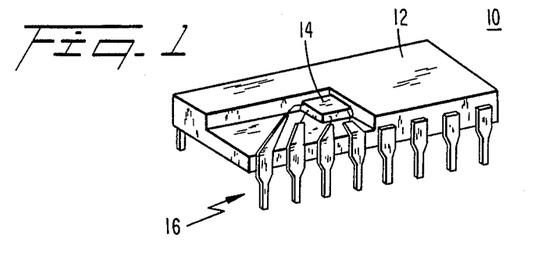
FIG. 1 is perspective view of an accelerometer according to the invention.

In accordance with the invention, there is provided a single-chip, integrated, accelerometer. As shown in FIG. 1, the accelerometer may include a specific packaging arrangement, as illustrated at 10, for example. The illustrated arrangement includes a support structure 12 for an integrated chip 14. The support structure may include electronic components integrated therein.

A number of pins 16 protrude from the package to provide external contact to various of the electronic components of the chip 14, as well as to any components otherwise associated with the packaging arrangement and as may be present in supporting structure 12, for example.

Figure 2:
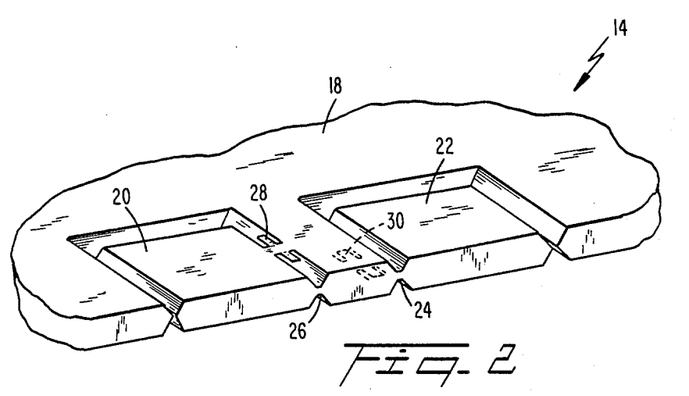
FIG. 2 is an enlarged partial perspective view of an accelerometer chip included in the arrangement of FIG. 1.

At FIG. 2 there is illustrated, in perspective, a more detailed illustration of the integrated accelerometer chip 14, shown in FIG. 1. Although the illustration of FIGS. 2, 3, and the remaining drawing figures illustrate a dual beam accelerometer, other accelerometer structures may be similarly integrated in accordance with the invention. Thus, the following description of operation of the structure of FIG. 2 relates to the vibrating beam accelerometer, or dual-beam-accelerometer, for illustrative purposes only and not to limit the scope of the invention.

In the structure illustrated at FIG. 2, there is provided a main body portion of the chip, shown at 18. This portion includes a substrate, as is known to those of ordinary skill in the art. A proof mass assembly, which includes a pair of proof masses in accordance with the dual beam accelerometer structure, is illustrated by proof masses 20 and 22. Each proof mass is connected by a respective flexure hinge to the main body portion. Further, each proof mass is associated with a force sensitive resonator between the proof mass and the main body portion. Thus, there is shown at 24 a flexure hinge for proof mass 22 while at 26 there is illustrated a flexure hinge for proof mass 20. On one side of chip 14 there is provided a first resonator 28, for proof mass 20, and on the other side of the chip 14 there is provided a second resonator 30, for proof mass 22.

Figure 3:
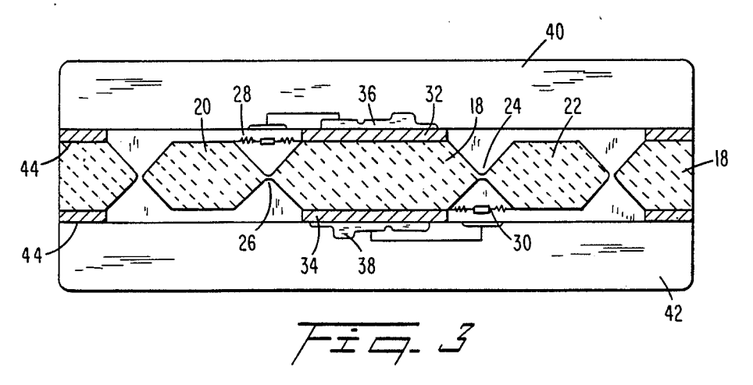
FIG. 3 is a cross-sectional view of the accelerometer chip shown in FIG. 2.

Referring now to FIG. 3, the structural arrangement of FIG. 2 is shown in greater detail in a cross-sectional view. As illustrated therein, the two proof masses 20 and 22 are connected by the respective flexure hinges 26 and 24 to the main body portion 18. Resonators 28 and 30 are similarly connected between respective proof masses 20 and 22 and the main body portion 18.

Also illustrated in FIG. 3 are a pair of electronic circuits 36 and 38, including therein a respective pair of analogue-to-digital converters. These converters, which may be of any circuit configuration known in the art, provide output digital signals on corresponding ones of pins 16, representative of frequencies of oscillation of resonators 28 and 30. Additionally, the electronic circuits shown at 36 and 38 close the respective loops of resonators 28 and 30.

Accordingly, there is illustrated in the arrangement of FIG. 3 an accelerometer configuration wherein the substrate, or main body portion, the proof masses, the flexure hinges and the resonators are all part of a single, monolithic, silicon structure. Additionally, the structure includes electronic analogue-to-digital circuitry. Such an arrangement is fabricated utilizing known solid state fabrication techniques, which may include micro lithography, epitaxy, thermal diffusion, chemical etching, and IC packaging methods.

In the embodiment illustrated at FIG. 3, the additional electronic circuitry shown at 36 and 38 is formed in separate electronic plates 40 and 42. Circuits 36 and 38 may thus be integrated in a monolithic structure formed in plates 40 and 42. These plates are bonded to the opposing sides of the substrate 18. Accordingly, there is provided an accelerometer package including a main body portion and mechanical components integrated therein, together with electronic components. Although electronic circuits 36 and 38 are shown for illustrative purposes as being formed in electronic plates 40 and 42, it should be understood that such electronic circuits may similarly be integrated in the same monolithic silicon structure including main body portion 18, thus to provide a completely self contained integrated accelerometer.

At appropriate locations, the packaging structure of FIG. 3 includes hermetic vacuum seals, such as illustrated at 44, for example. Seals 44 maintain a predetermined vacuum or gas environment around the proof masses and resonators.

The structure of FIG. 3 utilizes an accelerometer configuration which, in larger scale versions, has provided full-size, reliable, devices. Such full-size devices may utilize piezoelectric quartz technology, wherein two proof masses and two resonators are aligned with their input axes parallel but in opposite directions so that the masses respond oppositely to a movement along the axes. An arrangement of this type, called a push-pull configuration, yields an output signal which is highly linear with acceleration. Thus, the configuration of FIGS. 2 and 3 advantageously increases sensitivity of the accelerometer and reduces long-term thermal drift therein.

While the full-size accelerometer of this type, operating at a resonator frequency of 40 kHz, exhibits a dynamic range of $10^7$, analysis indicates that the high frequencies of operation of the structure of FIG. 3, made possible by the smaller dimensions of the solid state silicon resonators therein, can increase the dynamic range by an order of magnitude, to approximately $10^8$. For purposes of the foregoing description, dynamic range is defined as the maximum measured acceleration divided by the minimum resolvable acceleration.

Advantageously, the production cost of a device integrated in accordance with the invention may be reduced to approximately $500 including the electronic components thereof. However, experience in the microelectronics industry has found that integrated circuitry components of greater complexity than that provided herein are routinely fabricated for less than $50, when produced in large quantities. Further, the compact structure of the inventive device results in an integrated accelerometer weighing approximately 2 grams, for measurement of accelerations in the range of $\pm 100$ g, with survivability to 500 g (wherein 1 g=980 cm/sec$^2$). The deice of the present invention occupies a volume which is less than one cubic centimeter. Such lightweight devices advantageously may be used in a wide variety of applications, ranging from light-weight projectiles to precision guidance systems.

Figure 4:
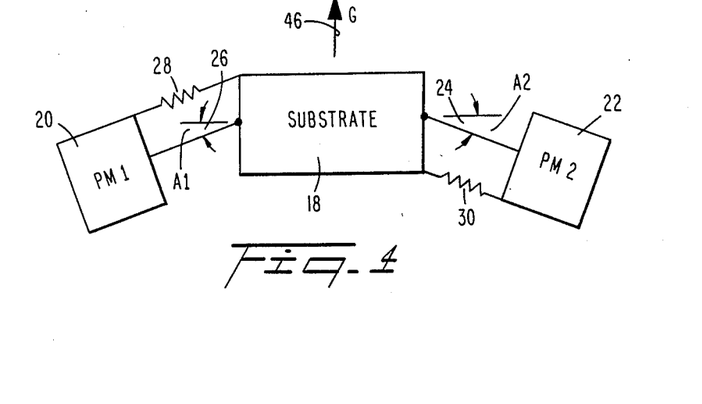
FIG. 4 is an illustrative sketch useful to understand operation of the accelerometer of FIG. 3.

In order to understand operation of the accelerometer illustrated at FIGS. 2 and 3, reference is made to the illustrative sketch of FIG. 4. As illustrated therein, when an acceleration force G is applied in the direction illustrated by arrow 46, proof masses 20 and 22 are rotated through angles A1 and A2. The proof masses rotate about substrate 18 by virtue of the flexure hinges 24 and 26 provided in the structure. In the arrangement of the embodiment illustrated in FIGS. 2–4, resonators 28 and 30 are provided on opposite sides of the substrate 18. Thus, acceleration in a given direction results in a tensile stress in resonator 28 and in a compressive stress in resonator 30.

Whether electrostatic is piezoelectric resonators are used, the opposing (compressive and tensile) nature of the stresses induced in the two resonators causes opposite variations in the frequencies of oscillations thereof. Thus, for illustrative purposes, the frequency of resonator 28 is increased and the frequency of resonator 30 is decreased. Accordingly, if the natural, unstressed, frequencies of resonators 28 and 30 differ by a predetermined constant, or are equal, then a response in the accelerometer to the application of an acceleration G thereto is an increase in frequency of one resonator and a decrease in the frequency of the other resonator.

Thus, the difference between the two frequencies yields a single measurement signal, having a frequency differing from a value representing the differences between the frequencies of the unstressed resonators by a frequency which is dependent upon the applied acceleration force. As a result, the magnitude and direction of the applied force may be measured by a simple measurement of the frequency of the difference signal.

Such a push-pull arrangement is routinely used in conventional vibrating beam accelerometers and provides an increased sensitivity and a reduced drift of the accelerometer, in comparison to single proof mass and single resonator structures.

The arrangement selected for the embodiment of FIG. 3 shows that acoustic motion of the resonators may both be sensed and excited electrostatically. By integrating the oscillator electronics needed to provide drive and sensing functions for the embodiment into a single assembly, such electrostatic sense and drive functions may be incorporated it he accelerometer. As a result, not only is the size of the instrument reduced, but so, too, are the stray capacitance, electromagnetic radiation and thermal gradients, all of which are sources of measurement error.

Referring now to FIGS. 5(a)-5(d), there is shown therein one of the methods which may be used to build the inventive structure.

Figures 5A, 5B:
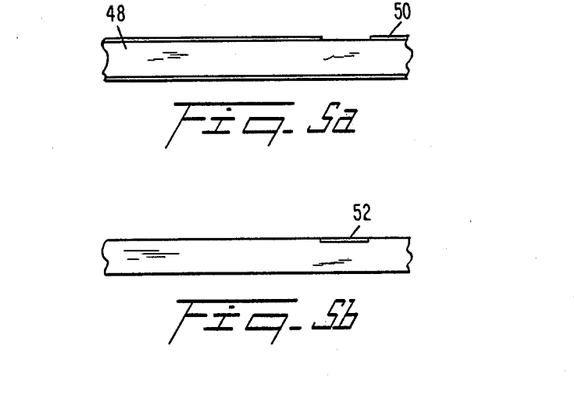
FIGS. 5(a)–5(d) illustrate a method used to manufacture the inventive accelerometer structure.

Specifically, at a first step, shown in FIG. 5(a), a doubly polished (100) silicone wafer 48 is patterned with a protective coating of silicon dioxide or silicon nitride, shown at 50. The pattern transferred to coating 50 outlines the top surface of the torsional resonator. The region under the resonator image is doped with a high level of boron in a diffusion step (not shown), carried out in a diffusion furnace as is known in the art of integrated circuit manufacture. Upon completion of the diffusion process, protective coating 50 is chemically removed, resulting in the post-diffusion substrate profile shown at FIG. 5(b). Therein, the portion of the upper surface of the silicon substrate which is doped with boron is shown at 52.

Figure 5C:
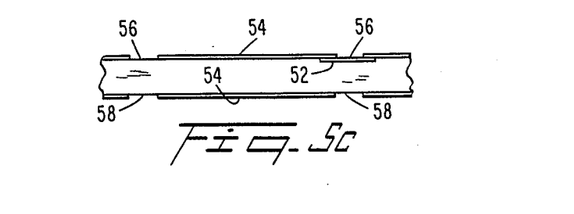

Thereafter, a second protective coating is deposited onto the wafer, and a second pattern is transferred thereto. As seen in FIG. 5(c), the second coating 54 is deposited onto both the top and bottom surfaces of the substrate. The top and bottom boundaries of each proof mass are defined by patterns 56 and 58, respectively.

Figure 5D:
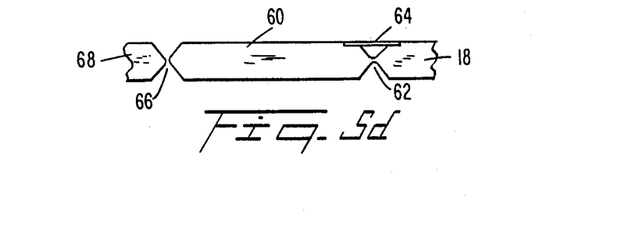

The wafer is thereafter preferentially etched in a solution of KOH and the protective coating chemically removed. The post-etch assembly is shown in FIG. 5(d). As illustrated therein, a proof mass 60 is connected by a flexure hinge 62 and resonator 64 to the main body portion 18 of the chip. Further, the proof mass 60 is separated at 66 from the adjacent structure 68 formed on the wafer.

Because of the highly an isotropic etch rates of silicon in KOH, with respect to substrate doping and crystal orientation, proper design and aligning of the lithographic patterns transferred at FIGS. 5(a) and 5(c) permits the chemical definition of the monolithic proof mass/resonator structure in a single etching process.

Appropriate design and alignment techniques will be readily apparent, in view of the foregoing description, to one of ordinary skill in the art of fabrication of microelectronic circuits. Moreover, since the steps hereinabove described are routinely used in fabrication of microelectronic circuits, additional processing steps needed to integrate the electronic components into the substrate may be easily added to the sequence of operations illustrated in FIGS. 5(a)-5(d).

Typical prior art, full-size, accelerometers of the vibrating beam variety hereinabove described operate at a resonator frequency of approximately 40 kHz and exhibit a dynamic range of $10^7$. In view of the smaller dimensions attainable by utilizing integrated circuit technology as hereinabove described, the frequency of operation of a silicon integrated resonator may be as high a several GHz.

Figure 6A:
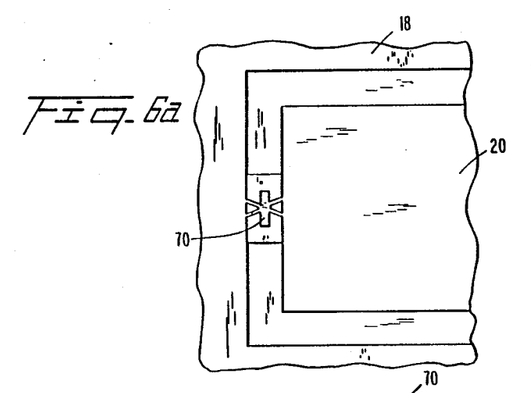
FIGS. 6(a) and 6(b) show a top view of an electrostatic torsional resonator and an enlargement thereof.
Figure 6B:
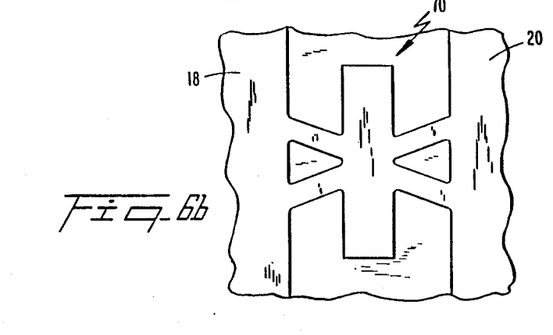

Referring now to FIG. 6, there is shown an electrostatic torsional resonator, etched between a proof mass and the main body of the accelerometer in accordance with the preceding description.

In particular, FIGS. 6(a) and 6(b), respectively, are a reproduction of a Scanning Electron Microscope (SEM) microphotograph of a typical silicon resonator, which may be used in FIGS. 2-3 at 38 or 30, and an enlargement thereof. The resonator, identified by reference numeral 70, is situated between a proof mass 20 and a surrounding main body portion 18 of the substrate. Resonator 70 is 500 microns long and is about 15 microns thick. The fact that it is best viewed under an electron microscope is testimony to its small dimensions and the degree of miniaturization that is possible with the silicon technology. This resonator represents one of several alternative designs that are compatible with the preceding description. Such resonators have been tested for resonant frequency and Q and have yielded the values previously outlined.

Figure 7A:
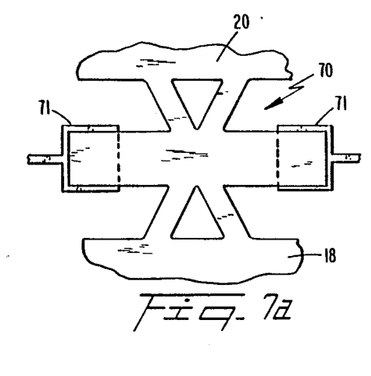
FIGS. 7(a) and 7(b) show an electrostatic drive arrangement for a force-to-frequency transducer using the resonator structure of FIGS. 6(a) and 6(b)
Figure 7B:
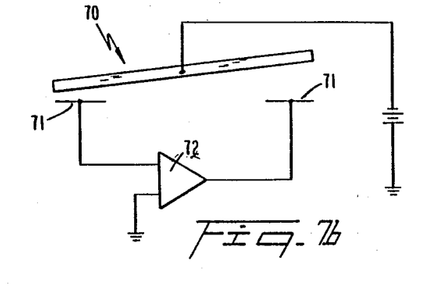
Figure 8A:
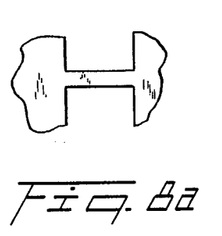
FIGS. 8(a), 8(b), 8(c) and 8(d) show a number of mechanical structures which may be used as resonators in accordance with the present invention.
Figure 8B:
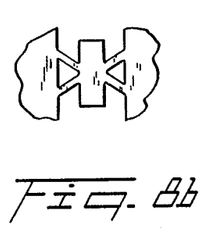
Figures 8C, 8D, 9B:
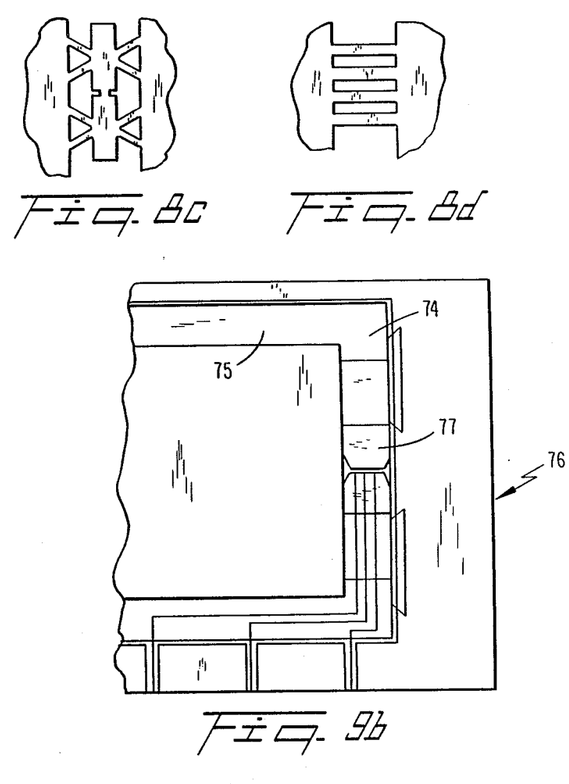
FIGS. 9(a) and 9(b) show silicon microstructures that exhibit the structural arrangement for the inventive resonator, and a reproduction of a microphotograph thereof.
Figure 9A:
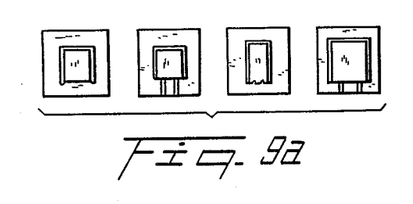

At FIGS. 7(a) and 7(b) there is shown schematically an electrostatic drive arrangement for such a transducer, while FIGS. 8–9 show yet other structures, fabricated utilizing micromachining processes similar to those hereinabove described.

The resonator structure 70, shown in FIGS. 6(a) and 6(b), is operated in the arrangement illustrated at FIGS. 7(a) and 7(b). Specifically, FIG. 7(a) shows a plan view of the resonator, between proof mass 20 and substrate 18 together with connectors 71 connecting the resonator in a feedback loop of a gain control circuit 72, symbolically shown as an amplifier. Movement of resonator 70 downwards at the left hand side of FIG. 7(b) and upwards at the right hand side of FIG. 7(b) causes a change in capacitance in the feedback loop of gain control circuit 72. Such a capacitance change results in an oscillating voltage in the loop, which may be tapped at any point in the closed loop. Resonators of this type were developed and operated at frequencies in the range of 12.5 kHz to 200 kHz, having a Q in the range of 10,000 to 200,000. Data relevant to the internal damping of a single crystal silicon indicates that Q's as high as 500,000 are possible.

The higher operating frequencies thus possible with use of the smaller solid-state resonators can increase the dynamic range by an order of magnitude, from $10^7$ to $10^8$.

A number of mechanical structures which may be used as resonators in accordance with the invention are shown in FIG. 8. As shown therein, both torsional and cantilevered structures are contemplated within the scope of the invention. The cantilevered resonators are shown in FIGS. 8(a) and 8(d), while the torsional resonators are shown in FIGS. 8(b) and 8(c).

The cantilevered resonators of FIGS. 8(a) and 8(d) exhibit a translational mode of vibration. On the other hand, the torsional resonators shown in FIGS. 8(b) and 8(c) exhibit a rotational mode of vibration.

In all cases, however, the frequency of vibration is modulated by the stress or strain applied across the resonators.

A silicon microstructure of another embodiment of an accelerometer structure using a resonator is shown in FIGS. 9(a) and 9(b). FIG. 9(a) is a reproduction of a photograph of four silicon accelerometer assemblies that were fabricated in accordance with the techniques shown in FIG. 5. These assemblies contain a variety of proof masses, flexure hinges, and resonators and are about 1 centimeter square and 0.025 centimeters thick. FIG. 9(b) is a reproduction of a microphotograph of one of these assemblies, showing an expanded view of critical silicon structures. A flexure hinge 74 is used to support a proof mass 75 on a substrate 76. A resonator 77 that is used to measure proof mass motion is also shown. All of these assemblies can be mounted into existing hybrid electronics packages.

Figure 10A:
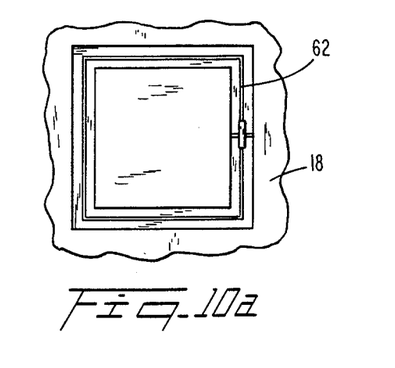
FIGS. 10(a), 10(b) and 10(c) show top, elevation and side views, respectively, of an integrated accelerometer.
Figure 10B:
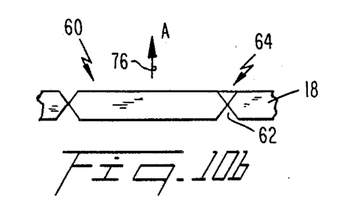
Figure 10C:
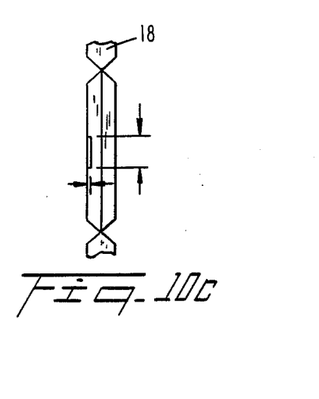

Such a structure illustrates the practicality of utilizing the above-described microelectronic fabrication techniques to manufacture the resonator for an integrated accelerometer. Referring now to FIGS. 10(a), 10(b) and 10(c), there are respectively shown therein a top view, an elevation and a side view of an integrated accelerometer in accordance with the invention. To simplify consideration, the illustrated design is a single proof mass/resonator assembly similar to the arrangement of FIG. 6(a). In view of the similarity of FIG. 10(b) with the post-etch assembly illustrated at FIG. 5(d), the same reference numerals are used to describe FIG. 10(b) as FIG. 5(d). Specifically, as seen in FIGS. 10(a), 10(b) and 10(c), the proof mass 60 is mounted on flexure hinge 62 and connected by the flexure hinge, as well as by resonator 64, to the silicon wafer substrate 18.

A design consideration for designing the proof mass 60 is the requirement of producing an out-of-plane deflection in response to an out-of-plane acceleration A, shown by an arrow 76 in FIG. 10(b). The deflection is magnified by the leverage of the proof mass hinge assembly, and results in a mechanical strain, which is proportional to acceleration, in the torsional resonator 64. The strain produces a small change in the natural frequency of the resonator. The resonator frequency is monitored by an electrostatic sensor, which may be connected to a post in the feedback circuit, as shown at FIG. 7(b). Thus, the proof mass/resonator assembly produces an oscillating signal having a frequency which is modified by application of an acceleration.

The natural frequency of the torsional resonator is one of the important parameters of the design of an integrated, monolithic accelerometer. The system requirements that specify resonator frequency are (1) maximum acceleration, (2) accelerometer nonlinearity, (3) minimum resolution, and (4) measurement time response. If the proof masses and resonators of the monolithic accelerometer are properly matched, these parameters are related by the equation:

$$f = \text{resonator frequency} = \frac{(g_{max})^{1.5}}{2\, t_{max}\, Kg_{min}(16\, g_n)^{\frac{1}{2}}}$$

where:
$g_{max}$ = maximum measurable acceleration = 100 g
$g_{min}$ = minimum resolvable acceleration = $10^{-6}$ g
$t_{max}$ = time of measurement response (@ $g_{min}$) = 2.5 s*
$g_n$ = nonlinearity error (@ $g_{max}$) = $1.3 \times 10^{-3}$ g*
K = electronic frequency multiplier = $10^4$ *

(*These quantities are typical of guidance system values.)

This equation yields a frequency of 137 kHz for a maximum acceleration of 100 g's and a minimum acceleration of 1.0 micro-g. This corresponds to a dynamic range of $10^8$, which is an improvement by an order of magnitude over known accelerometers. Other calculations show that these parameters produce a scale factor of 39 Hz/g with a frequency bandwidth (+100 g to −100 g) of 8 kHz.

The resonator frequency can also be calculated in terms of the structural parameters thereof, using Rayleigh's method of equating kinetic and potential energy as a function of frequency.

For the structure illustrated at FIGS. 10(a), 10(b) and 10(c), a height of 0.6 mm and square dimensions of 3.0 mm by 3.0 mm for the proof mass are contemplated, along with a width of 0.580 mm for the torsional resonator 64 and a depth of 0.01 mm therefor.

Figure 11:
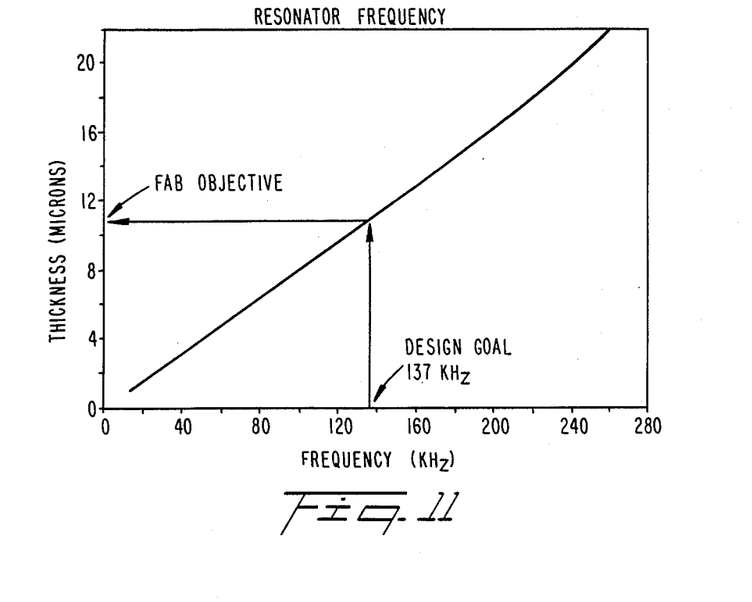
FIG. 11 shows a frequency-versus-thickness curve for the structure of FIGS. 10(a)–10(c) and FIG. 12 shows a further embodiment of an accelerometer incorporating the present invention.

For the above-described dimensions, shown in FIGS. 10(a), 10(b) and 10(c), there results a frequency-versus-thickness curve graphed in FIG. 11. This graph shows that a thickness of 10.6 microns is needed to meet the frequency requirements of the monolithic accelerometer. This thickness is attainable with the fabrication technology described above. Other calculations show that these parameters meet the scale factor and bandwidth specifications mentioned above.

There has accordingly been described herein a silicon micromachined accelerometer, integrated on a monolithic silicon chip. In the described product, both mechanical and electronic components are integrated in a single device. The resultant size reduction serves to reduce stray capacitance, electromagnetic radiation, structural damping and thermal gradients as sources of measurement error including accelerometer noise, drift and other measurement uncertainties.

The embodiments hereinabove illustrated maintain a high degree of performance required for inertial guidance and navigation applications, while further incorporating a structure which may be monolithically integrated with the aid of known solid state fabrication techniques. The integrated accelerometer may be provided in its entirety as a single component having a volume less than one cubic centimeter, including therein all mechanical components for a double, push-pull configuration, as well as electronic preamplifiers and oscillator circuits. Use of micro-lithographic techniques further reduces the cost of the accelerometer.

The resulting device is operable with a sensitivity better than one part in $10^8$. Additionally, the reduced magnitude of the proof mass leads to improvements in response time and reduction of measurement delay for the device.

Although particular resonator structures have been described herein, it should be recognized that other structures are known and may be substituted therefor. For example, open literature currently contains references to double cantilever beams, rotational beams, flat plates, and other resonant structures which may be fabricated with solid state manufacturing techniques. Each such structure may be used in the above-described apparatus.

Further, while an electrostatically driven resonator has been described and illustrated, other drive mechanisms may be used. For example, piezoelectric, magnetic, magnetostrictive, photoacoustic and thermal excitation are all compatible with silicon fabrication technology and with the above described design.

Still further, it should be recognized that while the precise etching technique hereinabove described is based on selective etching around a heavily P-doped silicon structure, other anisotropic etch processes, such as electrochemically controlled techniques, are also applicable to the fabrication method.

Figure 12:
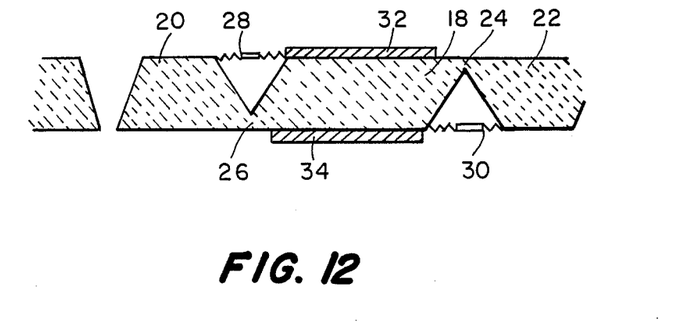

It should also be appreciated that while the flexure hinge is illustrated in the foregoing figures at the center of the silicon substrate plate, such a hinge may be located effectively at other positions, including the bottom of the substrate wafer, as shown in FIG. 12.

Additionally, while a conventional push-pull arrangement is illustrated in the figures, wherein a pair of acceleration sensing structures are connected electronically in a difference mode, a single acceleration sensing structure may be used.

Each of the possible modifications hereinabove described, as well as others that will occur to those of ordinary skill in the art, advantageously apply a solid state silicon manufacturing technology to fabrication of a vibrating beam accelerometer in order to reduce its size and cost, thereby to improve its operating performance. Thus, the invention provides a planar, monolithic, silicon structure integrating the proof mass, flexure hinge, and resonant force sensing elements of an accelerometer.

The disclosed invention particularly integrates the mechanical structure of a vibrating beam accelerometer into the oscillator loop and preamplifier electronics package thereof.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

What is claimed:

1. An integrated accelerometer comprising:
   a substrate having a monolithic single crystal structure including therein:
   mechanical means for oscillating at a predetermined frequency in response to application thereto of a predetermined acceleration;
   said mechanical means including proof mass structure monolithically integrated in said substrate;
   flexible hinging means monolithically integrated in a separating region in said substrate formed between a main body portion of said substrate and said proof mass structure for hingedly connecting said proof mass structure to said main body portion of said substrate; and
   resonating means monolithically integrated in said separating region of said substrate substantially opposite said flexible hinging means and connected between said proof mass structure and said main body portion, thereby restraining rotation of said proof mass structure about said flexible hinging means in one direction, said resonating means being operable for converting mechanical acceleration of said proof mass structure to an oscillating signal; and
   electrical means for converting oscillation of said mechanical means to an electrical signal indicative of a magnitude of said acceleration applied to said mechanical means.

2. An integrated accelerometer as recited in claim 1, wherein said electrical means comprises closed loop feedback means for controlling said oscillating signal.

3. An integrated accelerometer as recited in claim 2, wherein said electrical means further comprises analog-to-digital converting means responsive to said oscillating signal for providing a digital electrical output signal representative of a frequency of oscillation of said oscillating signal.

4. An integrated accelerometer as recited in claim 1, wherein said flexible hinging means is formed in a region substantially at a vertical center of a horizontal separation region between said proof mass structure and said main body portion of said substrate, and
said resonating means is formed at a surface portion of said substrate.

5. An integrated accelerometer as recited in claim 1, wherein said flexible hinging means is formed at one surface of said substrate in said separating region between said proof mass structure and main body portion and
said resonating means is formed at a second, opposite surface portion of said substrate.

6. An integrated accelerometer as recited in claim 5, wherein said flexible hinging means comprises first and second flexible hinges spaced apart from one another, said proof mass structure comprises first and second proof masses connected to said main body portion by said first and second flexible hinges, said first and second flexible hinges disposed on opposite surfaces of said substrate, and
said resonating means comprises first and second resonators, respectively opposite said first and second flexible hinges located at first and second separating regions separating said first and second proof masses from said main body portion.

7. An integrated accelerometer as recited in claim 6 wherein said first and second resonators each bridge across one surface of a respective one of said first and second separating regions, opposite to said first and second flexible hinges, respectively, said flexible hinges located at surfaces of said respective separating regions opposite to said first and second resonators.

8. A silicon micromachined accelerometer comprising:
a silicon micromachined substrate having a monolithic single crystal structure including:
a proof mass structure monolithically integrated in said substrate;
a main body portion monolithically integrated in said substrate;
flexible hinging means monolithically integrated in said substrate for hingedly connecting said proof mass structure to said main body portion; and
resonating means monolithically integrated in said substrate, said resonating means being responsive to said proof mass structure for converting mechanical acceleration of said proof mass structure to an oscillating signal;
said flexible hinging means being monolithically integrated in a separating region in said substrate formed between a main body portion of said substrate and said proof mass structure; and
said resonating means being monolithically integrated in said separating region of said substrate substantially opposite said flexible hinging means and connected between said proof mass structure and said main body portion, for restraining rotation of said proof mass structure about said flexible hinging means in one direction; and
electrical circuit means responsive to said oscillating signal for providing an electrical output signal representative thereof.

9. An accelerometer as recited in claim 8, wherein said electrical circuit means is monolithically integrated in said substrate.

10. An accelerometer as recited in claim 8, wherein said electrical circuit means comprises analog-to-digital converting means monolithically integrated in said substrate, for converting said oscillating signal to digital data having a value representative of a force applied to said proof mass structure.

11. An accelerometer as recited in claim 8 comprising, a push-pull structure wherein said proof mass structure comprises first and second proof masses, said flexible hinging means comprises first and second flexible hinges flexibly connecting said first and second proof masses, respectively, to said main body portion, and said resonating means comprises first and second resonators connected between said proof masses and said main body portion,
one of said resonators being arranged so that application of a force by an acceleration applied to the proof mass connected thereto results in a tensile stress therein,
the other of said resonators being arranged so that application of said force by said acceleration applied to the proof mass connected thereto results in a compressive stress therein,
thereby increasing a frequency of oscillation of said first resonator and decreasing a frequency of oscillation of said second resonator in response to application of an acceleration to said accelerometer,
said accelerometer further including a frequency difference measuring means for measuring a difference frequency between the frequencies of oscillation of said first and second resonators, thereby providing an output indication of said acceleration as a function of said difference frequency.

12. An accelerometer as recited in claim 11 wherein said resonating means comprises an electrostatically responsive structure for oscillating in response to acceleration of said proof mass structure.

13. An accelerometer as recited in claim 12 wherein said electrostatically responsive structure of said resonating means comprises a resonator driven by electrostatic forces and an electrical circuit feedback gain means for oscillating said resonator at a frequency responsive to a capacitance determined by a position of said resonator caused by mechanical response of said resonator to acceleration of said proof mass structure.

14. An accelerometer as recited in claim 13 wherein said electrical circuit feedback gain means is monolithically integrated in an electronic plate, said electronic plate bonded to said substrate.

15. An accelerometer as recited in claim 11 wherein said first and second resonators comprise respective first and second piezoelectric elements and first and second electrical circuit feedback means for respectively oscillating said first and second resonators in response to acceleration of said first and second proof masses.

16. An accelerometer as recited in claim 15 wherein said first and second piezoelectric elements are disposed on respective surfaces of said first and second resonators,
said first piezoelectric element and said first feedback means are monolithically integrated in a first electronic plate, said first electronic plate being bonded to one surface of said substrate, and said second piezoelectric element and said second feedback means are monolithically integrated in a second electronic plate, said second electronic plate being bonded to a second surface of said substrate.

17. An accelerometer as recited in claim 11 wherein said first proof mass and first resonator are aligned in an orientation having a first input axis, and
said second mass and second resonator are aligned in an orientation having a second input axis,
said first and second axes being parallel and opposite in direction to one another.

18. An accelerometer as recited in claim 11 wherein said first and second resonators are integrated in opposite surfaces of said substrate.

19. An acceleromter as recited in claim 18 wherein said first and second flexible hinges are integrated in opposite surfaces of said substrate,
each of said first and second flexible hinges being integrated opposite a respective one of said first and second resonators and separated therefrom by a respective one of first and second separating regions between said main body portion and said first and second proof masses.

* * * * *